(12) United States Patent
Jayaraman

(10) Patent No.: US 12,099,821 B2
(45) Date of Patent: Sep. 24, 2024

(54) SYSTEM AND METHOD FOR SORTING AND DISPLAYING OF USER ACCOUNT DATA

(71) Applicant: Truist Bank, Charlotte, NC (US)

(72) Inventor: Barath Jayaraman, Fort Mill, SC (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 18/163,968

(22) Filed: Feb. 3, 2023

(65) Prior Publication Data

US 2024/0264810 A1 Aug. 8, 2024

(51) Int. Cl.
*G06F 3/0481* (2022.01)
*G06F 8/38* (2018.01)
*G06Q 20/12* (2012.01)

(52) U.S. Cl.
CPC ............. *G06F 8/38* (2013.01); *G06F 3/0481* (2013.01); *G06Q 20/12* (2013.01)

(58) Field of Classification Search
None
See application file for complete search history.

(56) References Cited

U.S. PATENT DOCUMENTS

| | | | | |
|---|---|---|---|---|
| 10,325,568 | B2* | 6/2019 | Whiting | H04L 67/565 |
| 10,552,917 | B1* | 2/2020 | Kunz | G06Q 40/12 |
| 11,301,812 | B2* | 4/2022 | Egozi | G06F 16/2456 |
| 2012/0047425 | A1* | 2/2012 | Ahmed | G06F 40/174 |
| | | | | 715/234 |
| 2012/0197749 | A1* | 8/2012 | Gray | G06Q 30/08 |
| | | | | 705/26.3 |
| 2013/0173456 | A1* | 7/2013 | Grigg | G06Q 20/3221 |
| | | | | 705/35 |
| 2015/0220670 | A1* | 8/2015 | Linehan | G05B 13/042 |
| | | | | 700/282 |
| 2016/0048823 | A1* | 2/2016 | Wetzel | G06Q 20/384 |
| | | | | 705/39 |
| 2016/0098172 | A1* | 4/2016 | Bacinschi | G06F 8/38 |
| | | | | 715/747 |
| 2016/0124918 | A1* | 5/2016 | Ying | G06F 16/9577 |
| | | | | 715/234 |
| 2016/0292306 | A1* | 10/2016 | Migneault | G06F 30/00 |
| 2017/0090699 | A1* | 3/2017 | Pennington | G06F 3/04842 |
| 2018/0276182 | A1* | 9/2018 | O'Donovan | G06F 8/34 |
| 2018/0342019 | A1* | 11/2018 | Yang | G06F 16/958 |
| 2020/0363920 | A1* | 11/2020 | Ignatyev | G06F 16/2228 |
| 2021/0136458 | A1* | 5/2021 | Carney | H04N 21/47202 |
| 2021/0342837 | A1* | 11/2021 | Chen | H04L 9/3297 |
| 2022/0188523 | A1* | 6/2022 | Koneru | G06F 40/279 |

(Continued)

*Primary Examiner* — Tuyetlien T Tran
(74) *Attorney, Agent, or Firm* — Michael A. Springs, Esq.; Shumaker, Loop & Kendrick, LLP; Patrick B. Horne

(57) ABSTRACT

A computing system is configured to execute a method of displaying customized graphic content on a user device and includes steps of requesting, from a user of the user device, a selection regarding a change of display template to be utilized in determining graphic content to be displayed by the user device on the graphical user interface thereof, reconfiguring the user device and/or a mobile banking software application executable on the user device to cause the graphic content to be displayed by the user device during execution of the mobile banking software application on the user device, and displaying the graphic content on the user device during execution of the mobile banking software application.

18 Claims, 9 Drawing Sheets

(56) References Cited

U.S. PATENT DOCUMENTS

| | | | | |
|---|---|---|---|---|
| 2022/0188933 | A1* | 6/2022 | Cruttenden | G06Q 40/06 |
| 2022/0261809 | A1* | 8/2022 | Perkins | G06Q 20/12 |
| 2023/0311653 | A1* | 10/2023 | Grammatico | G06F 3/04845 |
| | | | | 701/101 |
| 2023/0351392 | A1* | 11/2023 | Costa | G06Q 20/4016 |
| 2023/0385820 | A1* | 11/2023 | Doan | G06Q 20/389 |

* cited by examiner

SYSTEM AND METHOD FOR SORTING AND DISPLAYING OF USER ACCOUNT DATA

FIELD

This invention relates generally to a platform for conducting mobile banking, and more particularly, embodiments of the invention relate to a platform for conducting mobile banking that alters a display of transaction related data in reaction to a user selecting an alternative display template corresponding to a different set and/or configuration of the transaction related data.

BACKGROUND

It is becoming increasingly common for individuals to utilize a mobile banking platform, such as a dedicated website or smart device compliant software application, for conducting and subsequently monitoring financial transactions. Specifically, such mobile banking platforms provide the ability for the individual to quickly and efficiently access relevant data relating to the individual's finances, such as reviewing the current balance or account settings associated with a specific bank account, credit card account, loan agreement, or the like. In this way, the individual can have up-to-date information regarding the financial condition of the individual, thereby aiding the individual in making better-informed financial decisions.

The mobile banking platform also allows the user to conduct certain financial transactions from substantially any location, including from the home, thereby eliminating the need for the user to travel to a physical banking location. For example, the mobile banking platform may provide the ability for the user to remotely transfer funds between the various different accounts associated with the mobile banking platform, or to remotely deposit physical checks via corresponding features of an associated smart device.

Unfortunately, such mobile banking platforms have thus far failed to provide an effective means for the users thereof to quickly and efficiently review and understand the transaction related data that is monitored and recorded by such mobile banking platforms. Specifically, such mobile banking platforms typically offer only limited options in reviewing such data, such as reviewing transactions individually or reviewing complicated and data intensive transaction related account statements in attempting to determine specific relationships and/or trends. The use of such mobile banking platforms for finding, categorizing, sorting, or sequencing such transaction related data may accordingly be unnecessarily time consuming and labor intensive.

There is accordingly a need for an efficient and effective system and method for the retrieving, sorting, and displaying of mobile banking transactions during navigation of a mobile banking platform according to the selections of a user.

BRIEF SUMMARY

Embodiments of the present invention address the above needs and/or achieve other advantages by providing apparatuses and methods that facilitate the ability to retrieve, sort, and display financial data in real-time via appropriate selections by a user during navigation of the corresponding mobile banking platform.

Embodiments of the invention include a computing system for displaying customized graphic content on a graphical user interface of a user device. The computing system comprises at least one processor, a communication interface communicatively coupled to the at least one processor, and a memory device storing executable code that, when executed, causes the processor to provide a selection to a user of the user device regarding a display template provided by the computing system. The display template is associated with instructions utilized in determining graphic content to be displayed by the user device on the graphical user interface thereof. The graphic content determined by the selection of the display template visually represents transaction related data associated with an account of the user managed by the computing system. The processor reconfigures the user device and/or a software application executable on the user device to cause the graphic content corresponding to the user selected display template to be displayed by the user device on the graphical user interface thereof during execution of the software application on the user device and according to the user selected display template and displays the graphic content corresponding to the user selected display template on the graphical user interface of the user device during execution of the software application.

According to further aspects of the invention, the instructions utilized in determining the graphic content may correspond to one or more of a filtering of the transaction related data to be displayed in the graphic content, a sorting by category of the transaction related data to be displayed in the graphic content, a sequencing of the transaction related data to be displayed in the graphic content, or a format of the transaction related data to be displayed in the graphic content. The selection of the display template may correspond to the format of the graphic content being a list of transactions. The selection of the display template may further correspond to the list of the transactions being filtered according to one of monetary amount or a time of occurrence. The selection of the display template may further correspond to the list of the transactions being sequenced according to one of monetary amount or order of occurrence. The selection of the display template may further correspond to the list of the transactions being sorted and grouped according the category of each of the transactions to be displayed in the graphic content. The selection of the display template may further correspond to the list of the transactions being sorted and grouped according to monetary value or a time of occurrence.

The selection of the display template may correspond to the format of the graphic content being a chart or a graph. The graphic content may illustrate a trend in the transaction related data. The graphic content may illustrate a distribution of the transaction related data according to a category of the transaction related data.

The transaction related data may be associated with a plurality of transactions, and the selection of the display template may further correspond to the plurality of transactions being sorted and grouped according to whether the transactions occurred via an in-person transaction process or an online or digital transaction process.

The reconfiguring of at least one of the user device and/or the software application may include the replacement of existing graphic content representing the account of the user with the graphic content instantaneously selected by the user via the selection of the display template. The existing graphic content may correspond to a default display template or may correspond to a previously selected display template.

The display template may be selected from a plurality of display templates provided by the computing system with each of the plurality of the display templates resulting in one or both of a different appearance of the graphic content or different transaction related data being displayed in the graphic content. The plurality of the display templates may differ from one another according to at least one of a filtering criteria for determining the filtering of the transaction related data to be displayed in the graphic content, a sorting criteria for determining a categorization and grouping of the transaction related data to be displayed in the graphic content, a sequencing criteria for determining the sequencing of the transaction related data to be displayed in the graphic content, or a format criteria for determining a format of the transaction related data to be displayed in the graphic content.

A first one of the plurality of the display templates may correspond to the transaction related data being displayed in a list of transactions and a second one of the plurality of the display templates may correspond to the transaction related data being displayed in one of a chart or graph. The plurality of display templates may be selectable by the user contemporaneously with the displaying of the graphic content corresponding to the currently selected display template. Each of the plurality of display templates may be associated with a selectable interactive area of the graphical user interface of the user device.

According to embodiments of the invention, a method of displaying customized graphic content on a graphical user interface of a user device is disclosed. The method comprises the steps of: providing a selection to a user of the user device regarding a display template provided by the computing system, wherein the display template is associated with instructions utilized in determining graphic content to be displayed by the user device on the graphical user interface thereof, wherein the graphic content determined by the selection of the display template visually represents transaction related data associated with an account of the user managed by the computing system; reconfiguring the user device and/or a software application executable on the user device to cause the graphic content corresponding to the user selected display template to be displayed by the user device on the graphical user interface thereof during execution of the software application on the user device and according to the user selected display template; and displaying the graphic content corresponding to the user selected display template on the graphical user interface of the user device during execution of the software application.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
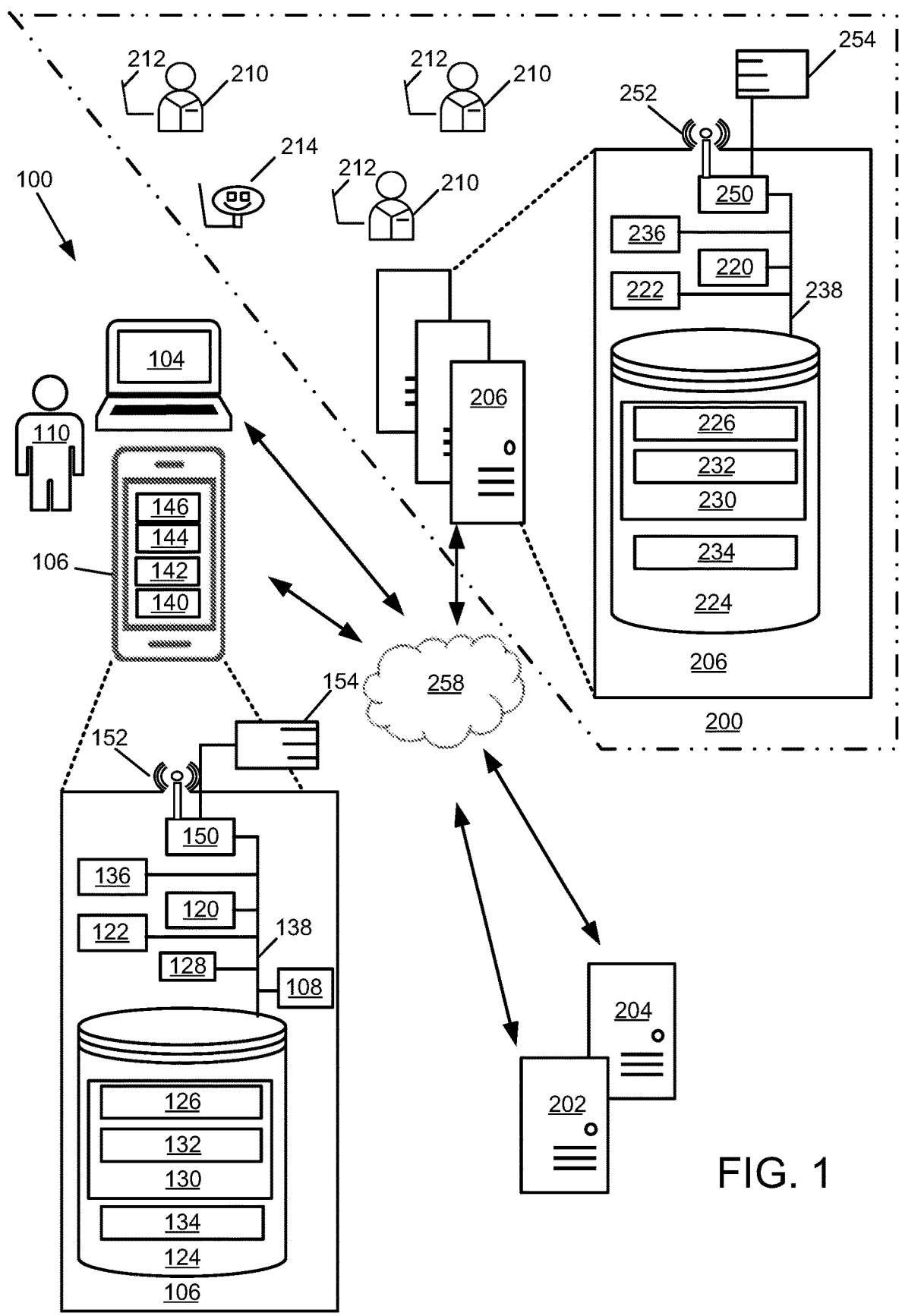

Having thus described embodiments of the invention in general terms, reference will now be made to the accompanying drawings, wherein:

FIG. 1 illustrates an enterprise system and environment thereof for engaging with a user during navigation of a mobile banking platform, in accordance with one embodiment of the present invention.

Figure 2:
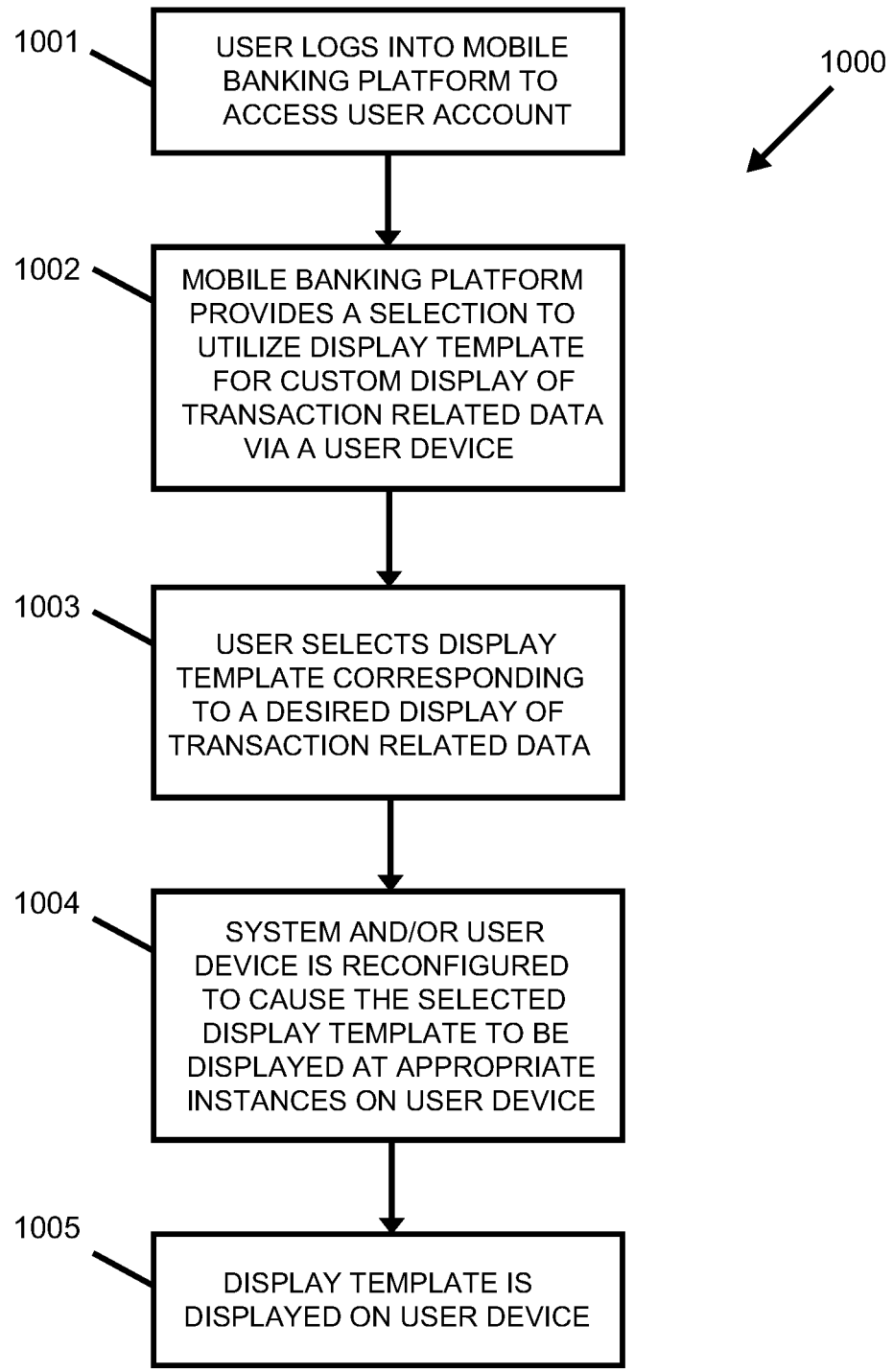

FIG. 2 is a flow chart summarizing a method of displaying customized graphic content on a user device during execution of a mobile banking platform.

Figure 3:
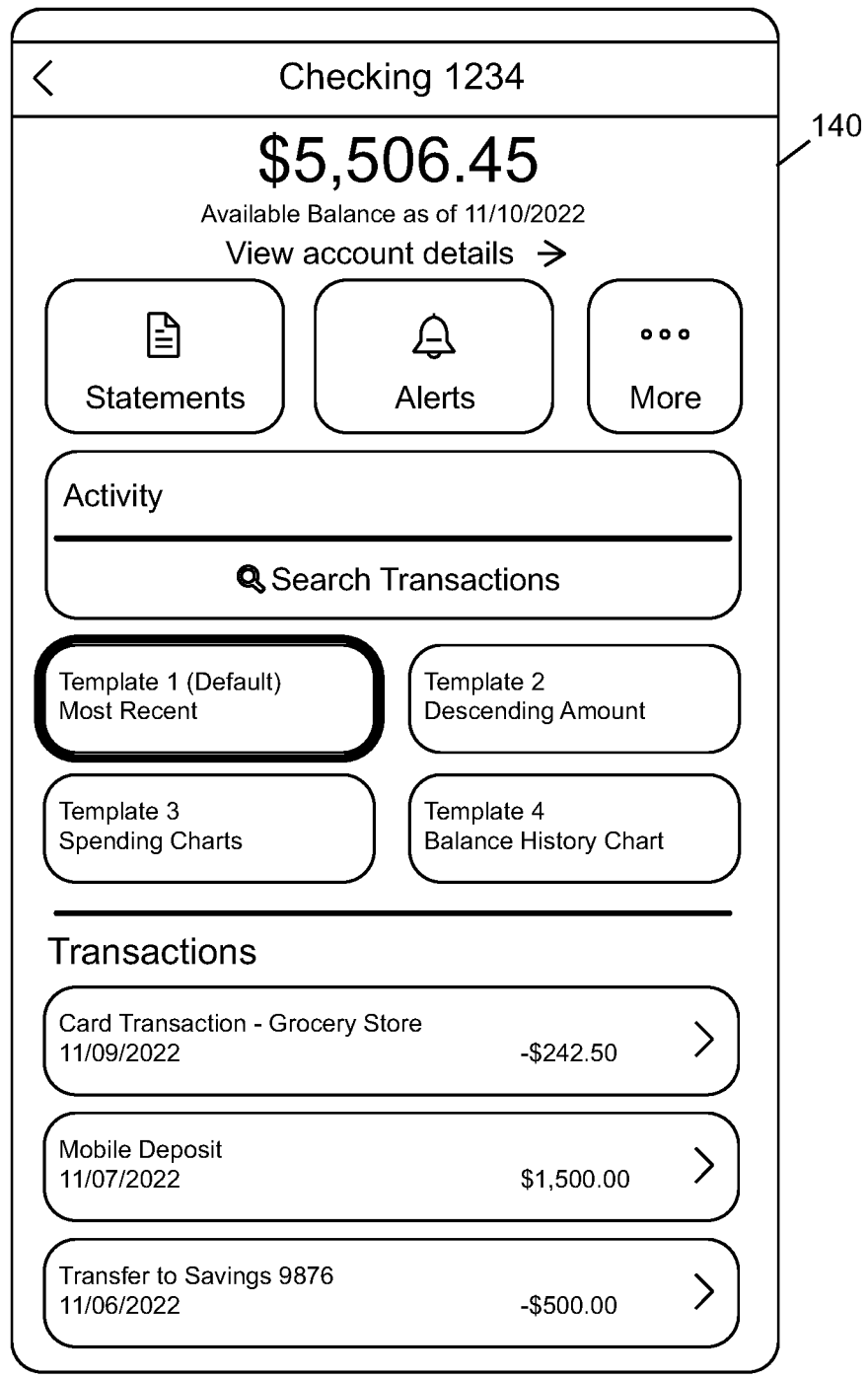

FIG. 3 is an exemplary display of a user device illustrating a graphical representation of transaction related data configured according to a user selected first display template corresponding to a default display template of the mobile banking platform.

Figure 4:
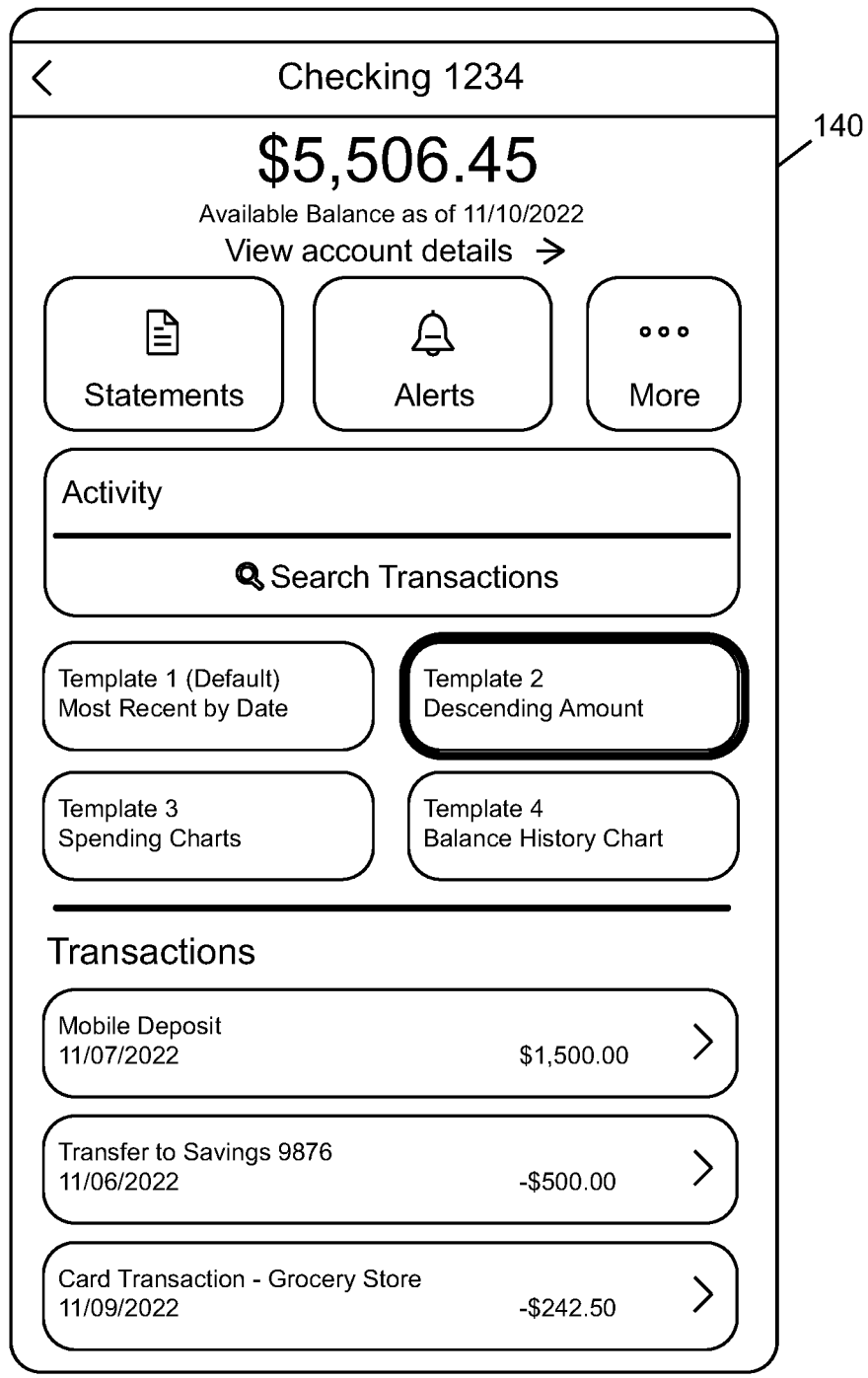

FIG. 4 is an exemplary display of a user device illustrating a graphical representation of transaction related data configured according to a user selected second display template corresponding to a resorting of the illustrated transaction related data.

Figure 5:
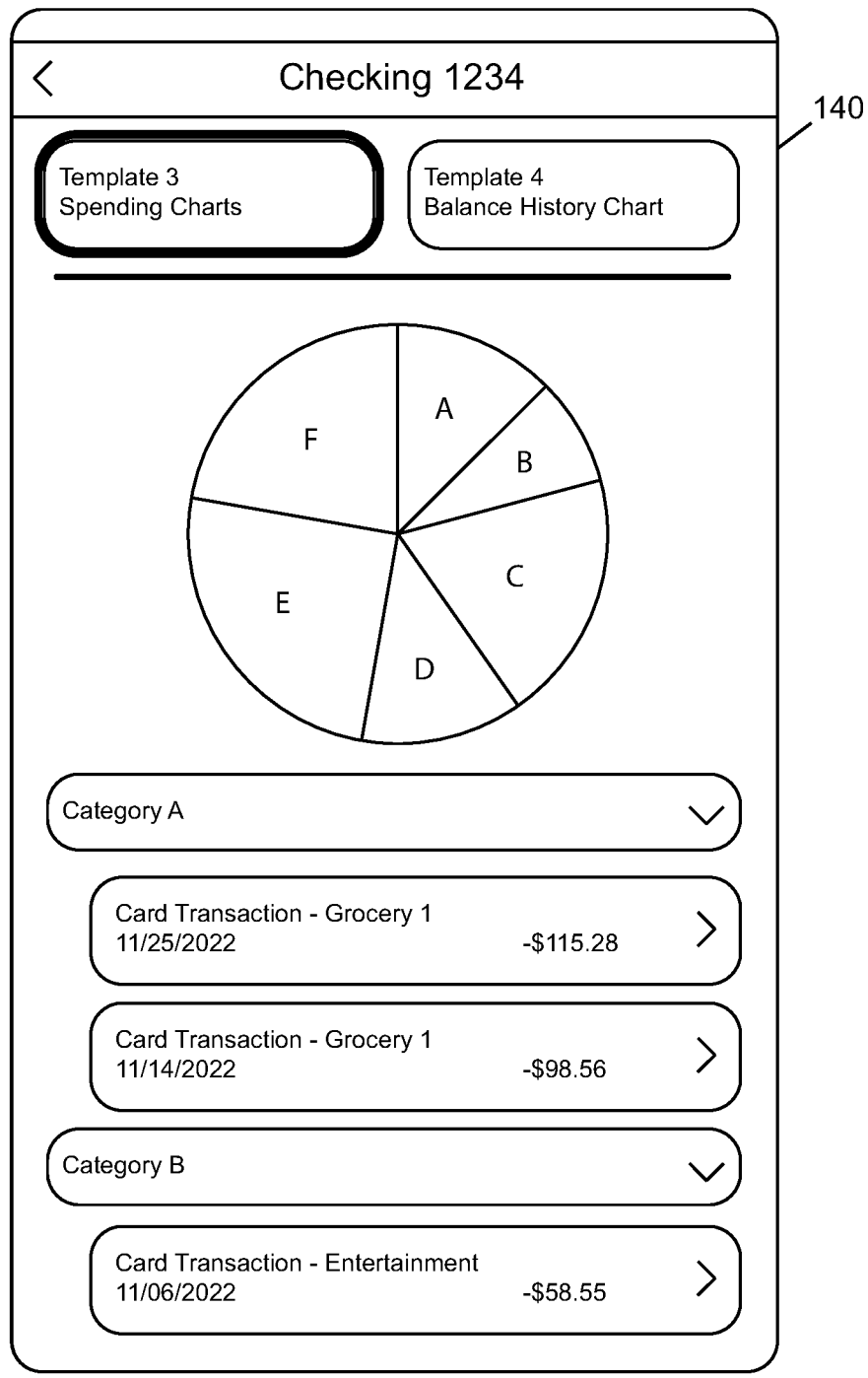

FIG. 5 is an exemplary display of a user device illustrating a graphical representation of transaction related data configured according to a user selected third display template having a pie chart for graphically representing the transaction related data.

Figure 6:
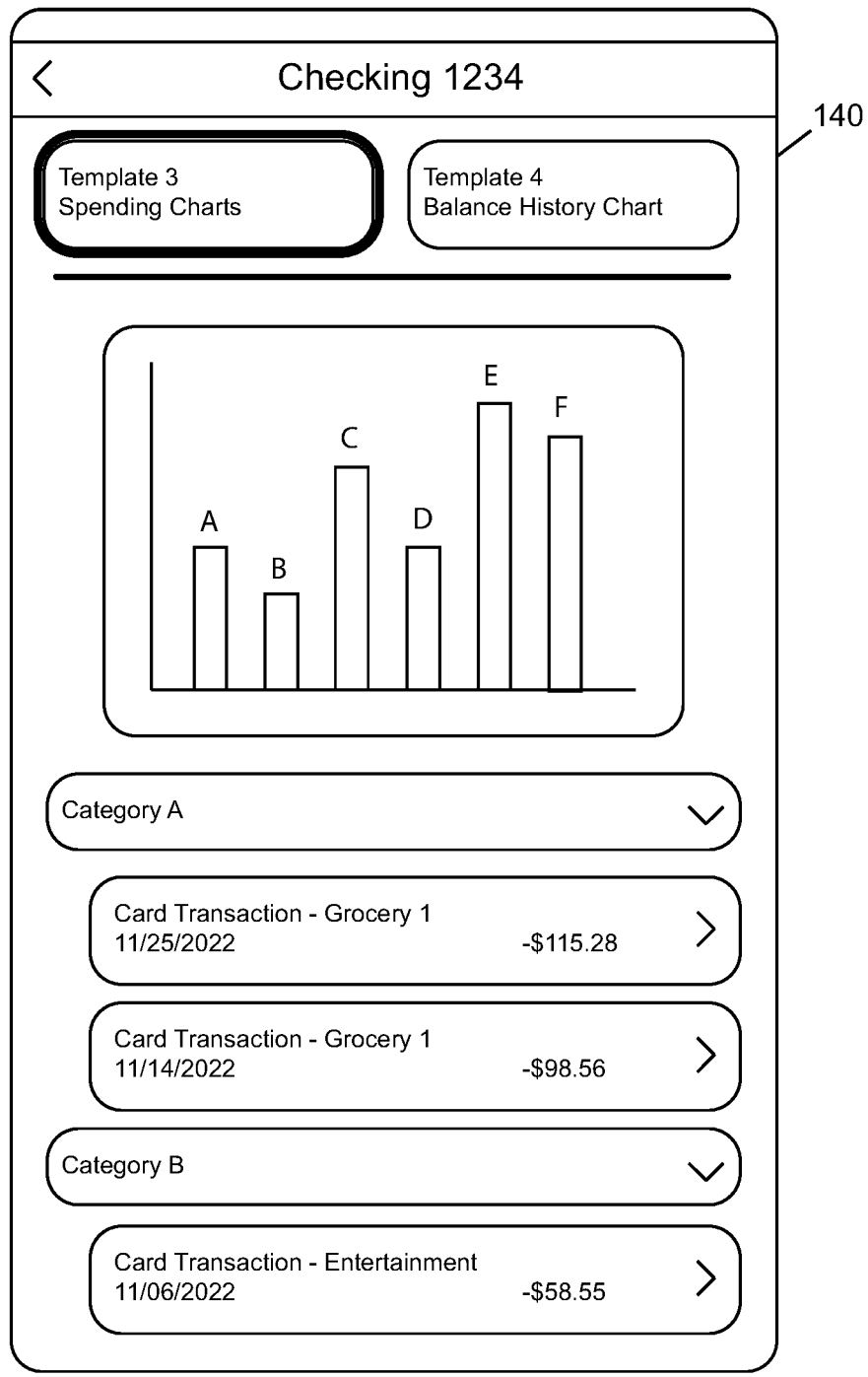

FIG. 6 is an exemplary display of a user device illustrating a graphical representation of transaction related data configured according to an alternative user selected third display template having a bar graph for graphically representing the transaction related data.

Figure 7:
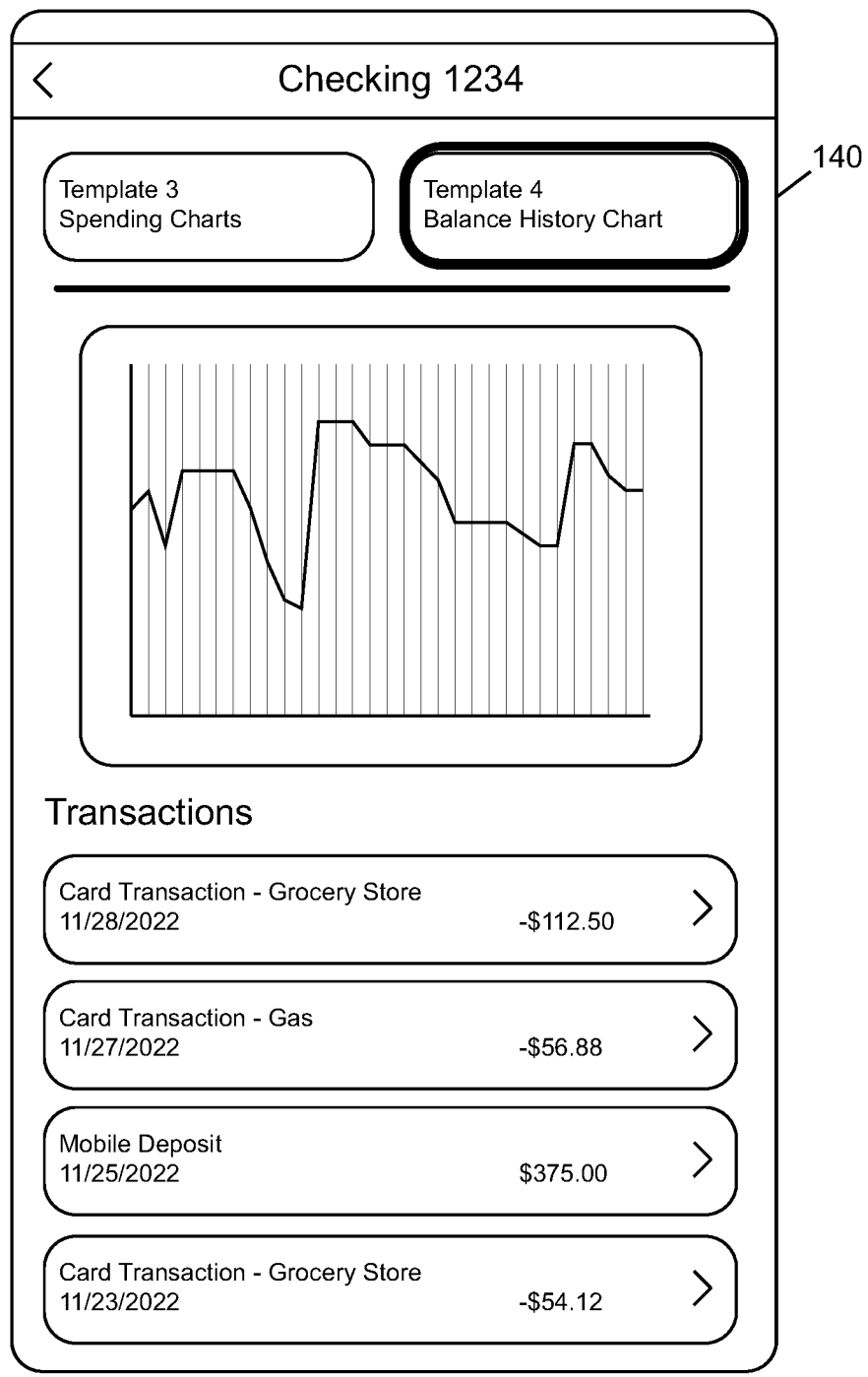

FIG. 7 is an exemplary display of a user device illustrating a graphical representation of transaction related data configured according to a user selected fourth display template having a line graph for graphically representing a trend in the transaction related data.

Figure 8:
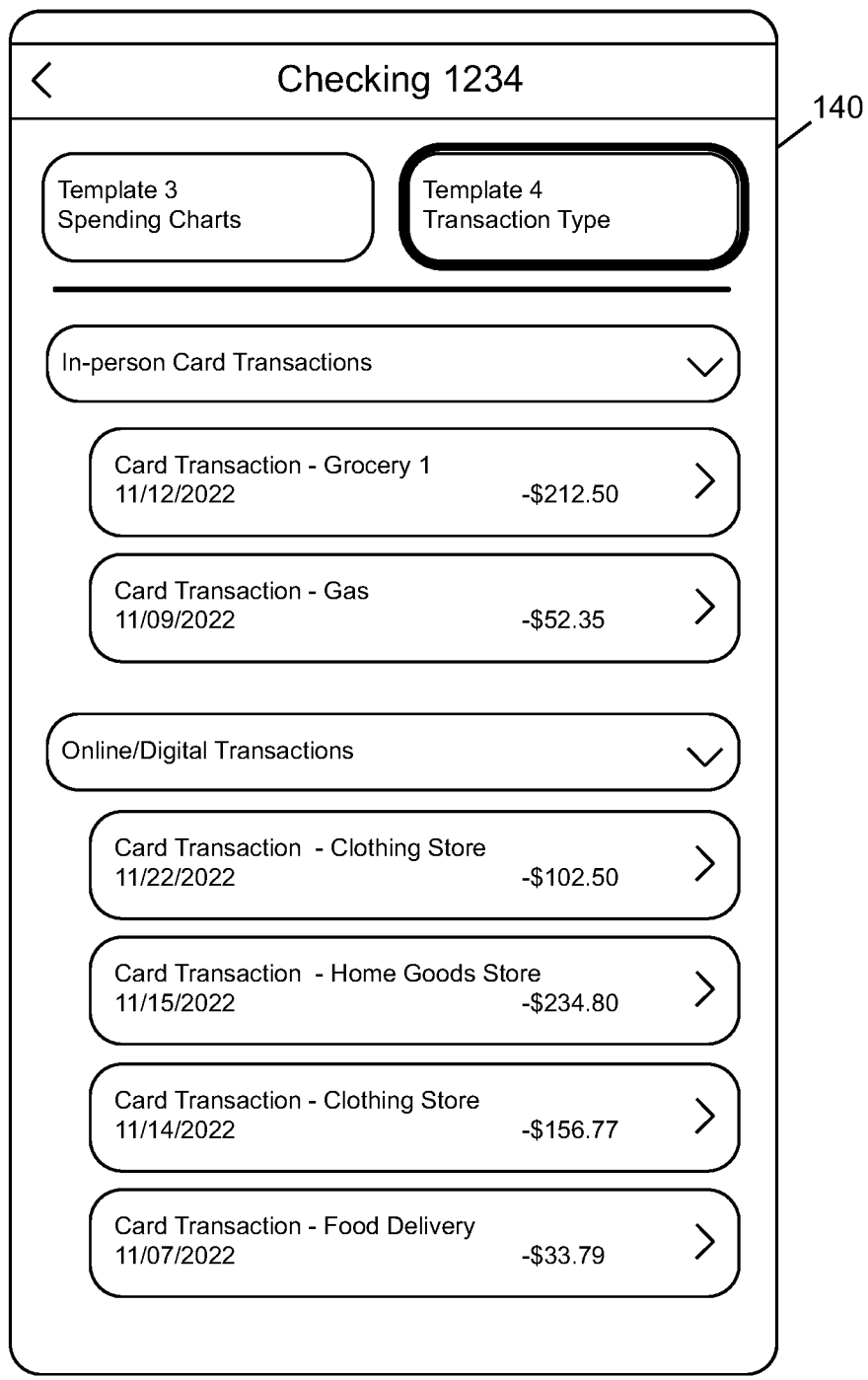

FIG. 8 is an exemplary display of a user device illustrating a graphical representation of transaction related data configured according to an alternative user selected fourth display template corresponding to a re-categorization of the transaction related data.

Figure 9:
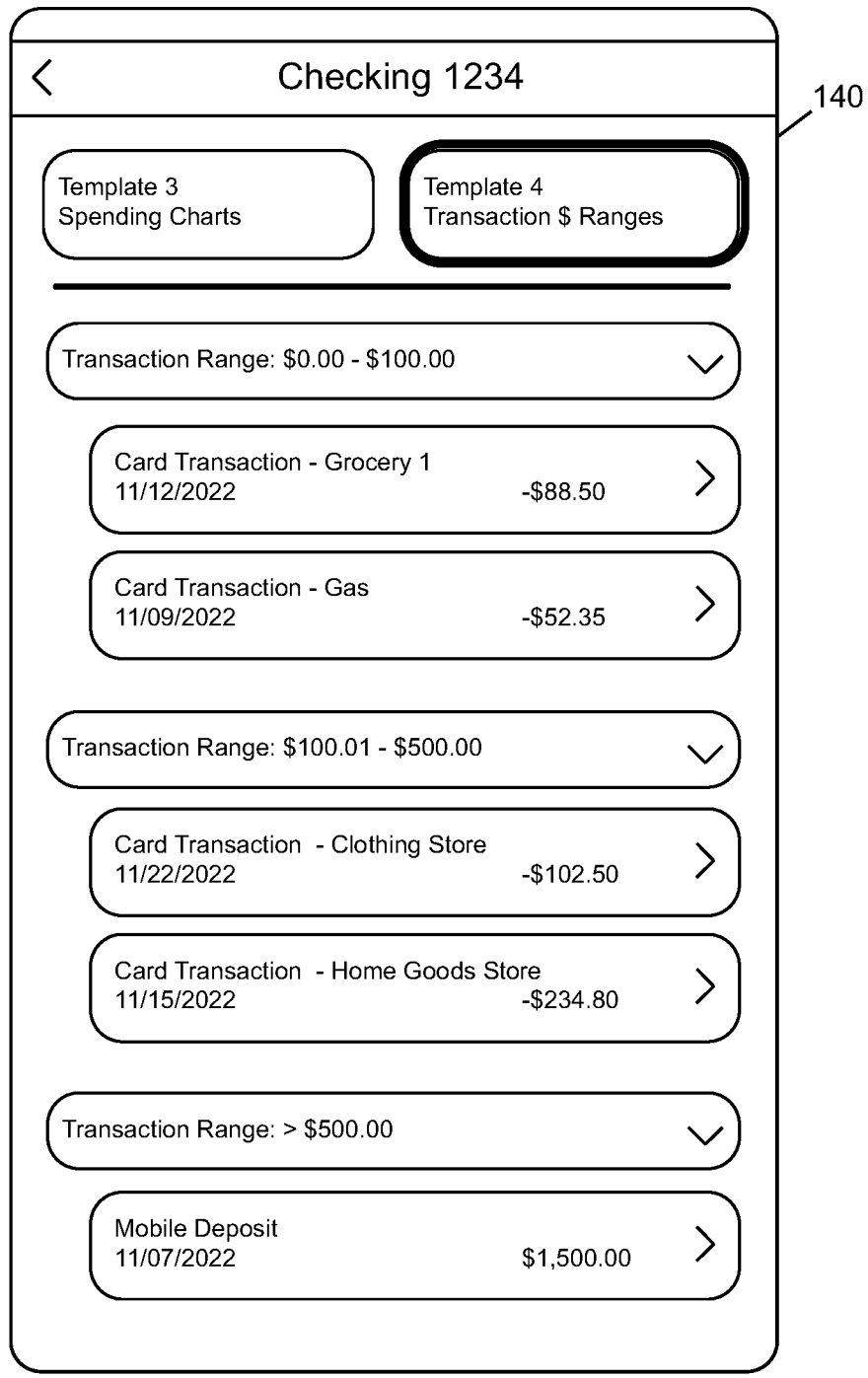

FIG. 9 is an exemplary display of a user device illustrating a graphical representation of transaction related data configured according to an alternative user selected fourth display template corresponding to a sorting of the transaction related data according to ranges of transaction related data values.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to"

and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the illustrated application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared, as needed.

The present invention relates to a method of operating the described enterprise system 200 for interacting with a corresponding user 110 accessing a mobile banking platform associated with the enterprise system 200. As used herein, the mobile banking platform generally refers to a platform that is accessible to the user 110 via an appropriate network connection, such as a mobile banking website or a mobile banking application. If the mobile banking platform refers to a mobile banking website, the user 110 may access the website via an appropriate browser software application operating on the corresponding user device 104, 106, wherein navigation of the mobile banking website provides the user 110 access to certain data regarding the user 110 as maintained by the enterprise system 200. If the mobile banking platform refers to a mobile banking software application, the user 110 may access the mobile banking software application via the corresponding user device 104, 106 for access to the data regarding the user 110 as maintained by the enterprise system 200 in the absence of the operation of the previously described browser application. The mobile banking software application may be representative of the previously described application 132 operable on the user device 106, as one non-limiting example.

It is generally assumed hereinafter that the same features of the mobile banking platform may be accessible via use of the website accessible via the browser application or the direct use of the mobile banking software application, unless specified otherwise. It should also be generally understood that the website and the software application may generally include the display of the same data regarding the user 110, but may in some circumstances include a different arrangement of such data to best accommodate the configuration of the corresponding user device 104, 106, such as accommodating a specific screen configuration or a specific user input method. The mobile banking platform is described hereinafter as being "interacted with" by the user 110 during navigation thereof. It should be understood that such interactions may refer to any suitable interactions capable as acting as an input to the corresponding user device 104, 106, such as a corresponding touch screen interaction, mouse button click, keyboard stroke, voice activated command, or the like, as the circumstances may warrant. Such interactions are generally understood to correspond to a selection of an identifiable area of the display of the mobile banking platform, such as corresponding to a specific image, video display, text, or other representation of data, which in turn redirects the platform to change the data instantaneously displayed to the user 110 via a reconfiguration of the corresponding graphical user interface.

The mobile banking platform is shown and described hereinafter with reference to the navigation of a dedicated mobile banking software application 132 as may be executed on the user device 106 having the described display 140 acting as the graphical user interface thereof. However, as described above, it should be readily apparent that the same features may be applied to the corresponding software application or browser application during use of the user device 104 and any associated input or output devices thereof.

As mentioned hereinabove, each of the users 110 described herein may be a person or entity acting as a customer or client of the enterprise system 200 that utilizes products and/or services from the enterprise system 200 as defined herein, or may otherwise be a person or entity having an established relationship with the enterprise system 200 such that the enterprise system 200 has access to the necessary personal data regarding each of the participating users 110 for making the determinations described hereinafter. The relationship present between the enterprise system 200 and a corresponding user 110 may include the user 110 having a user account with the enterprise system 200 wherein certain actions of the user 110, actions of the enterprise system 200, and/or interactions between the enterprise system 200 and the user 110 may be monitored and recorded by the computing system 206 of the enterprise system 200. Such data of each of the users 110 of the enterprise system 200 may be in the form of the data 234 stored to the storage device 224 of the computing system 206 as utilized for carrying out the functions of the mobile banking platform as described herein. The data 234 may originate from various different sources including the recorded interactions of the user 110 with the enterprise system 200 and/or the recorded interactions of the user 110 with one or more third-party and external sources or systems, which may be representative of the previously disclosed external systems 202, 204.

The user account of each corresponding user 110 may refer to a primary or umbrella account of the user 110 from which data corresponding to various additional or subaccounts is accessible during navigation of the mobile banking platform. For example, upon providing the necessary login credentials to access the corresponding user account via the mobile banking platform, the logged-in user 110 may then be able to access each of a variety of different financial accounts maintained by the enterprise system 200 and associated with the user 110. As one non-limiting example, the user account of the user 110 may include access to each of a checking account, a savings account, and a credit card account, each of which is maintained or monitored in some form by the enterprise system 200 and associated with the user 110. However, the user account may include access to any form of financial account including a record of financial transactions associated with the financial account, such as debits, credits, or transfers between accounts, among other possible transactions. Each transaction of a corresponding financial account may be associated with certain data, such as a corresponding monetary amount and/or date of transaction, by which such transactions may be appropriately categorized or otherwise sorted.

The examples provided hereinafter generally correspond to the types of transactions that would be expected to occur when managing a checking account associated with a corresponding debit card and/or a credit card account associated with a corresponding credit card, wherein various purchases, payments, and transfers of funds are typical actions taken in managing such accounts. However, it should be readily apparent that the same general concepts described herein may be applied to alternative financial accounts having the monitoring of similar data while remaining within the scope of the present invention. For example, the user account may further include access to a financial account wherein the past charges and/or payments regarding a loan agreement or similar financial obligation are monitored and recorded for access by the user 110.

The personal data accessible to the enterprise system 200 regarding the user 110 may include data regarding products and/or services offered to the user 110 by the enterprise system 200 relating to banking, checking, savings, investments, credit cards, automatic-teller machines, debit cards, loans, mortgages, personal accounts, business accounts, account management, credit reporting, credit requests, and credit scores, as non-limiting examples. The data may further include files such as those for user accounts, user profiles, user account balances, user transaction histories, user investment portfolios, past communications with the user, or files downloaded or received from other devices such as the user devices 104, 106 of the user 110.

Referring now to FIG. 2, a flowchart illustrates a method 1000 according to the present invention for establishing and broadcasting/outputting (displaying) a customized display of the mobile banking platform, wherein the customized display is based on selections provided by the user 110 and outputted via the graphical user interface of a corresponding user device 104, 106. Specifically, the present invention relates to the manner in which data reported by the mobile banking platform during navigation thereof is displayed to the corresponding user 110 for viewing and/or interaction therewith, and especially those data relating to transactions that have occurred with respect to one or more of the user accounts associated with the user 110, wherein such transaction related data are accessible via navigation of the mobile banking platform. All such displays of data are assumed to occur following a successful login by the user 110 wherein the user 110 is given permission to access the corresponding user account as maintained by the enterprise system 200.

The examples shown in FIGS. 3-9 all correspond to a display of the mobile banking platform following the selection of a corresponding checking account, and include exemplary transactions that would be considered typical of the standard use of such a financial account. It should be readily appreciated that the examples shown and described with reference to FIGS. 3-9 may be adapted for use with similar accounts such as credit card accounts, savings accounts, and so forth, as desired. It should also be readily understood that alternative forms of transactions not shown or elaborated on herein may be carried out in accordance with such user accounts without departing from the scope of the present invention, so long as the corresponding transaction related data is able to be categorized, sorted, sequenced, grouped, and/or displayed in accordance with the methods disclosed herein.

In accordance with the above, the method 1000 may include a first step 1001 wherein the user 110 accesses the corresponding user account associated with the mobile banking platform for selecting the option to customize/personalize at least some display-related content associated with the corresponding user account. The accessing step 1001 may include the user 110 entering the necessary credentials for accessing an umbrella account associated with a plurality of sub accounts, such as a savings account, a checking account, a credit card account, etc. Once the user 110 has entered the necessary information or otherwise interacted with the mobile device 106 in a necessary manner for gaining access to the umbrella user account, which may include conducting a process utilizing multi-factor authentication, the user 110 may then be prompted to select a specific subaccount or a specific card associated with such a subaccount for selecting the customization options described herein. As mentioned above, the present examples shown in FIGS. 3-9 assume that the user 110 has successfully logged in and made a selection to view transaction related data with respect to the user's checking account.

The method 1000 then includes a step 1002 wherein the computing system 206 queries the user 110 to make a determination regarding the selection of an option to utilize customized/personalized display content with respect to a selected one of the user accounts as accessible following the step 1001, wherein the customized/personalized content is associated with some form of digital representation of data associated with the selected user account that is able to be broadcast/output (displayed, in the present example) to the user 110 via the corresponding user device 104, 106. As used herein, the querying of the user 110 by the computing system 206 may refer to any situation wherein the computing system 206 requests an input from the user 110 for recording a selection or preference of the user 110. The querying of the user 110 may accordingly include the computing system 206 actively prompting the user 110 to make the necessary determination. For example, during navigation of the mobile banking platform, there may be instances where such determinations are prompted, such as by opening a request box in reaction to certain actions taken by the user 110. Alternatively, the querying may include the user 110 actively choosing to interact with the computing system 206 to make the necessary determination, such as requiring the user 110 to navigate the mobile banking platform for discovering the desired settings or preferences that are able to be interacted with for making a desired selection.

The present invention may include the user account being associated with various different account settings or the like that may be selected by the user 110 in determining how data is displayed to the user 110 when accessing one of the described financial accounts. In some examples, the account setting or user selection corresponding to such a determination is shown as being accessible to the user 110 via an interaction with a corresponding interactive area of the display of the user device 106 when the user 110 is viewing the transactions associated with the selected financial account. However, it should also be apparent that such selections need not be accessible to the user 110 when directly accessing such information, and may instead be selected by the user 110 when navigating an independently provided menu or other user selection means accessible during navigation of the mobile banking platform. For example, any user selections described hereinafter may be able to be made by the user 110 during the review of a list or menu of possible selections or features available to the user 110, as opposed to such requests being made via interaction with an interactive area of the display screen 140 dedicated to making such a selection during the review of such transaction related data. The user 110 making such selections when not directly viewing the associated transaction related data may beneficially provide additional screen space on which the transaction related data is displayable to the user 110 when the user 110 does not wish to have the selectable interactive areas accessible during the review of the transaction related data.

FIGS. 3-9 correspond to exemplary graphical representations of the display 140 of an associated mobile device 106 that may be associated with the execution of the method 1000. However, it should be understood that the graphical representations of FIGS. 3-9 are merely exemplary in nature and are not intended to be limiting to the manner in which the described information is to be displayed to the user 110. Specifically, different layouts and/or graphics may be utilized for communicating the same data, as desired, without affecting the manner of operation of the present invention. It should also be readily apparent that the described navigation of the mobile banking platform, such as the mobile banking software application 132 as executed on the mobile device 106, is also merely exemplary of one possible scenario, and is therefore not limiting to the present invention. For example, certain options described as being selectable by the user 110 hereinafter may be accessed via alternative routes or may be associated with different text, headings, subheadings, tabs, links, options, preferences, or the like, when navigating the corresponding mobile banking platform.

As used herein, each customized or selected display configuration of transaction related data may be referred to as a display template. Each display template may correspond to a filtering/sorting/categorization of the transaction related data, a sequencing of the transaction related data, an arrangement/grouping of the transaction related data, a varying form of graphical representation of the transaction related data, and/or varying graphics/images representing the transaction related data, and combinations thereof, for altering the manner in which the transaction related data is displayed to the user 110 each time a different display template is selected for display via the display 140 of the corresponding user device 104, 106. That is, each selection of a different display template from that of a previously selected display template includes a change in at least one or more of the filtering/sorting/categorization criteria, the configured arrangement/grouping, the utilized form of graphical representation, and/or the graphics utilized in representing the transaction related data when displayed to the user 110 with respect to the selected display templates.

The filtering mentioned herein refers to a selection of which transactions and which data entries related to such transactions are to be displayed to the user 110 with respect to the selected template. For example, the filtering of the transaction related data may include only those transactions occurring within the current billing period or past month being utilized and displayed when such a display template is selected. As another example, the filtering may only include those transactions that include a monetary value below a certain value, above a certain value, or within a certain range of certain values being utilized and displayed with regards the selected display template. As yet another example, the filtering may include only certain data, such as the data and monetary amount, being displayed with respect to each displayed transaction. The filtering may include only certain categories of the transactions or transaction related data being displayed, such as those transactions that relate to purchases of certain categories of good and/or services (such as dividing purchases into groceries, entertainment expenses, gas, etc.). The filtering according to categorization may also refer to any differentiation between the transaction related data associated with each transaction that may displayed, such as categorizing certain transactions according to whether the transactions were carried out using a transaction card to perform an in-person transaction (such as a swipe, chip insertion, short-range wireless communication method) or to perform an exclusively online/digital transaction, categorizing certain transactions as debits/credits, categorizing certain transactions as pending or completed, or the like. It should be readily understood that the transaction related data may be separated and categorized according to any data that would be expected to be associated with, recorded, and reported to the user 110 with respect to any such transaction.

The sorting or sequencing of the transaction related data may include each transaction displayed in a specific order or with a specific display position or configuration according to the value/entry of certain transaction related data associated with each displayed transaction. For example, the transactions shown may be shown according to an ascending or descending monetary value, or by a most or least recent transaction by occurrence (time and/or date), or by grouping certain transactions according to one of the specific categorization criteria described above.

As mentioned in the above examples, the different categorization associated with the different templates may include grouping certain transactions based on at least one of the data entries associated with the categorized transactions, including the type of transaction, a monetary range of transactions, a certain temporal range of transactions, a division of in-person or digitally occurring transactions, a division of different types or forms of transactions, a division of different entities with which transactions are conducted, a division of certain goods and/or services associated with such transactions, or the like.

The different arrangements associated with different templates may refer to different orders of certain data being displayed, certain spatial configurations of such data, or the like, such as varying the display format to include different numbers or rows or columns for displaying the transaction related data for the selected template. For example, each different transaction may be shown in a single column in a list form, or certain transactions may be shown in multiple rows or columns corresponding to a grid form.

The different forms of graphical representation may refer to the transaction related data being displayed in text format, in chart or graph format, or otherwise in a format wherein specified graphics or indicia represent some form of transaction related data associated with the corresponding transaction. For example, one template may include a text list of different transactions with the desired transaction related data shown with respect to each shown transaction, whereas another template may include this same data illustrated in a chart or graph, thereby offering a different visual impression to the user 110 with respect to the same and/or overlapping transaction related data.

The different graphics associated with the different templates may refer to any variation in the visual form or configuration of the transaction related data as shown on the display, such as varying the font of text, the size of text, the color scheme utilized, the shapes and dimensions of certain elements, the images representing certain data, etc. For example, a change in template may include an enlargement of all text and a different color scheme to allow for easier reading of the displayed transaction related data, such as may be necessary for those with visual impairments.

In some embodiments, the step 1002 may include the computing system 206 querying the user 110 to select an option to choose among the plurality of the different display templates, each of which varies from a default display template that is normally utilized in displaying one possible set of transaction related data to the user 110, as opposed to always and exclusively utilizing the default display template for displaying the transaction related data accessible to the user 110 during navigation of the mobile banking platform. The default display template may include a listing of all transaction having occurred within a certain period of time with the transactions listed from most recent to least recent. FIG. 3 illustrates one example of such a default display template having the transactions and the desired transaction related data sorted according to the order in which such transactions occurred, as indicated by the exemplary dates.

Each of the different display templates may be provided (preselected) by the enterprise system 200 and may be associated with instructions utilized by at least one of the computing system 206, the user device 104, 106, or the software application 132 executing the mobile banking platform for determining the desired transactions to be considered and/or displayed, the transaction related data entries of such transactions to be considered and/or displayed, and the visual configuration and form of such transaction related data when displayed on the display 140 of the user device 104, 106. That is, each display template may correspond to a program or application configured to receive and analyze the transaction related data of the user 110 for sorting and/or filtering the transaction related data according to the requirements of the corresponding display template, and to determine the form and configuration of the transaction related data to be displayed via the display 140 of the user device 104, 106 based on this sorting and/or filtering.

The querying of the user 110 to utilize an alternative display template may include one or more interactive areas represented on the corresponding display 140 that can be interacted with by the user 110 to rapidly select a different display template from that previously selected. For example, FIG. 3 includes the display of four different interactive areas corresponding to four different templates that may be selected. The four different interactive areas may be provided at a desired position on the display 140 when displaying transaction related data associated with the selected display template, such as being arranged above or below the transaction related data associated with the instantaneously selected display template, to allow for the ability to change the displayed template substantially contemporaneously with the review of the instantly selected display template. In FIG. 3, the selected "Template 1" corresponds to what may be considered the current selection for the default display template of the user 110, which includes the sorting of the displayed transactions by most recent to least recent.

Although not shown, the method according to the present invention may include the user 110 having a selection among the plurality of the different display templates to establish a different one of the display templates as the default display template that will normally be the display template shown to the user 110 when first accessing the corresponding user account for which review of the transaction related data is desired. The method may further include the user 110 having the option to select which of the plurality of the display templates to make accessible for interaction contemporaneously with the display of another of the display templates, the ordering of such display templates, the positioning of such display templates on the display 140, and/or the number of the plurality of the display templates accessible contemporaneously via the display 140. For example, the four different display templates, and the ordering/numbering thereof, may be established by the user 110 via selections thereof among a plurality of display templates (including additional non-illustrated display templates), thereby allowing for customization of the contemporaneously selectable display templates shown on the display 140 of the user device 104, 106.

In other embodiments, the user 110 may not have access to the interactive areas corresponding to the different display templates in the manner shown in FIG. 3 wherein such interactive areas are positioned adjacent graphical representations of the transaction related data. Instead, the user 110 may access such settings or preferences via an alternative method, such as selecting the display template to be displayed among a list accessible via navigation of the mobile banking platform to a corresponding options or preferences menu, or the like (not shown).

The method 1000 then includes a step 1003 wherein the user 110 selects the desired display template for utilization when accessing/using the associated user account. The step 1003 may be performed by the user 110 via any appropriate interaction with the corresponding user device 104, 106 according to any of the described methods of the computing system 206 querying the user 110 regarding such a selection.

The user 110 may be prompted to accept and/or save the selection of the display template to subsequently be the default display template, wherein the selected and saved display template corresponds to the desired display of the transaction related data that is available when the user 110 initially accesses the corresponding user account, such as during future uses of the mobile banking platform. The user 110 may also be prompted to save any other described settings, such as the display templates selected for contemporaneous selection on the display 140, in the same manner. Depending on the method of operation of the mobile banking platform, such as the method of operation of the mobile banking software application 132, the preferences regarding the default or displayed display template(s) to be utilized with respect to the user 110 may be stored to the memory device 122 and/or storage device 124 of the user device 104,106 or to the memory device 222 and/or storage device 224 of the computing system 206 of the enterprise system 200.

For example, in some embodiments, if selections are made by the user 110 regarding certain display template preferences, then such selections may be stored to the user device 104, 106, thereby avoiding the need for the enterprise system 200 to host and store all such selections for reference whenever to be displayed. In other embodiments, all selections or preferences are stored to the storage device of the enterprise system 200, wherein such selections are communicated to the user device 104, 106, when prompted. In other embodiments, the storage of the user selections is dependent on the circumstances, and may be distributed between the user device 104, 106, the computing device 206, and any necessary external systems 202, 204, so long as the selections can be readily communicated to the user device 104, 106 for displaying the desired display template during execution of the corresponding mobile banking platform. It should be readily apparent to one skilled in the art that substantially any method of accessing and retrieving the desired selections corresponding to the display templates may be utilized while remaining within the scope of the present invention.

In accordance with any of the above-described circumstances, the method 1000 according to the present invention includes a step 1004 of reconfiguring the software application 132 executing the mobile banking platform and/or the user device 104, 106 on which the software application 132 is being executed to broadcast (display) the newly selected customized/personalized content during execution of the mobile banking platform. The reconfiguring step 1004 broadly refers to any necessary steps that must be taken by the computing system 206 of the enterprise system 200 to result in the selected software application 132 corresponding to the mobile banking platform displaying the user selected display template via the user device 104, 106 during certain uses of the mobile banking platform software application 132. The reconfiguring step 1004 may be dependent on the manner in which the selected software application 132 determines what content to display and the origin of the displayed content. For example, as mentioned above, certain embodiments of the software application 132 may refer to selections/preferences stored to either of the user device 104, 106 or to the computing system 206 when determining what content to display graphically during use of the selected software application 132, and may utilize whatever communication or retrieval methods are necessary to result in the display of the desired display template via the software application 132.

In some embodiments, such as when the preferences of the user 110 are stored to the computing system 206, the computing system 206 may utilize the transaction related data associated with the user 110 known to the computing system 206 in conjunction with the known user preferences regarding the display template(s) to be utilized to determine the content to be displayed to the user 110, wherein the necessary data is transferred from the computing system 206 to the user device 104, 106 for causing the display 140 to shown the desired content in the desired format. In other embodiments, such as when the preferences of the user 110 are stored to the user device 104, 106, the computing system 206 may communicate the transaction related data to the user device 104, 106 to be utilized by the mobile banking platform software application 132 in conjunction with the known user preferences to determine which of the transferred transaction related data to show to the user 110 and in what format to show it, based on the currently selected display template. In either instance, the display 140 is reconfigured to include an alternative configuration of the transaction related data whenever a different one of the display templates is selected by the user 110 for display on the user device 104, 106.

Once all necessary reconfigurations of the selected software application 132 and/or the user device 104, 106 are completed in accordance with the present method, the method 1000 then includes a step 1005 of broadcasting (displaying) the customized display content, via the user device 104, 106, during execution (use) of the selected software application 132. This may occur immediately upon the selection of the desired display template, and may include a reconfiguration of the display 140 from a previously selected iteration of one of the display templates.

FIGS. 3-9 illustrate several different examples of the display templates and the possible combinations of features possible via the use of such display templates. As mentioned above, FIG. 3 may be representative of a standard or default display template (Template 1) including the transactions being sequenced by how recent the transactions occurred, which may be restricted to a time period, such as the current billing statement, the past week, the past month, or the like. In contrast, FIG. 4 includes the user 110 selecting what is shown as a different display template (Template 2) corresponding to the transactions being sequenced by the highest to the lowest amount, which may again include the transactions being limited to certain time period to restrict the number of applicable transactions.

FIG. 5 illustrates another display template (Template 3 in the present example) wherein at least some of the transaction related data associated with at least some of the user transactions is displayed to the user 110 graphically in the form of a chart or a graph, as opposed to a text-based listing of such data. The example shown in FIG. 5 includes only those transactions corresponding to purchases via the selected user account (checking account), such as within a given time period, that correspond to each of six categories of purchases labeled A-F, which may be representative of categories such as groceries, gasoline, entertainment, utilities, etc. The display template of FIG. 5 also includes a combination of the graphical pie chart with text-based representations of the same data for further reference. In the provided example, each category is listed separately and may also include the purchases falling under that category being further sorted/filtered/sequenced by monetary amount, time, type, etc. according to the described examples. FIG. 6 shows an alternative version of the display template (also labeled Template 3) wherein the same transaction related data is shown in bar graph format as opposed to pie chart format. FIGS. 5 and 6 are accordingly representative of examples wherein the selection of different display templates allows for the immediate reconfiguration of the transaction related data to the user 110 in a manner that may be a different, and potentially more useful or favorable, impression to the user 110 in understanding or ascertaining the data in question.

FIG. 7 illustrates another display template (Template 4, as selected) wherein an account balance of the selected checking account is shown with respect to a line graph indicative of the balance at certain time intervals, such as every determined daily balance. The example of FIG. 7 accordingly aids in illustrating certain trends associated with the transaction related data, which may aid the user 110 in making certain financial decisions. Such trends may be shown with respect to any set of the transaction related data associated with the tracked transactions. As some examples, transactions may be graphed or charted in the sequence they occur, transactions may be graphed or charted according to a sequence of greatest to least and/or least to greatest, or the transactions may be graphed or charted to show the total cumulative charges/amounts/costs associated with the set of transactions being graphed or charted over a period of time or by sequenced transactions. Any such charts or graphs described herein may also be associated with any combination of any of the filtering/sorting/sequencing/categorization criteria described herein for differentiating the different transactions and corresponding sets of transaction related data from one another, such as limiting the contents of any such charts or graphs to only certain categories and/or ranges of values/entries for only illustrating the desired relationships to the user 110.

FIG. 8 includes an example wherein the transactions displayed are sorted based on the method of use of the debit card associated with the present checking account. The transactions are sorted based on whether the debit card was utilized in-person at a card reader at a point-of-sale or whether the transaction was carried out digitally, such as via use of an appropriate internet protocol. Such a division of the transactions allows the user 110 to see how the different uses of such a debit card (or credit card in alternative examples) affect the spending habits of the user 110. The example of FIG. 8 also shows another instance wherein multiple filtering/sorting/sequencing/categorization criteria are utilized, as each different type of card transaction includes further listing of the transactions associated therewith in an order corresponding to how recent the transactions occurred.

Finally, FIG. 9 includes an example wherein the transactions displayed are sorted/categorized according to what range of monetary values the transactions fall within, such as differentiating small, moderate, or large transactions separately. In addition to ranges of monetary values, similar configurations of the transaction related data may be associated with ranges of certain dates, or other numerical qualifiers, as apply. In some embodiments, the method may further include the querying of the user 110 regarding the ranges to be utilized in differentiating the transaction related data, such as the end points of any ranges selected.

As can be seen within the examples of FIGS. 5, 6, 8, and 9, the different categorizations or groupings of the transactions to be displayed may include the use of drop down menus or the like for selectively hiding or revealing the individual transactions and corresponding data entries corresponding to each categorization or grouping, thereby allowing for the amount of space occupied by the transaction related data to be altered during navigation of certain display templates. Each of the provided examples further includes the use of graphical indicia (right-facing arrows) corresponding to each displayed transaction indicative of the ability of the user 110 to access certain transaction related data associated with the corresponding transaction that is not already shown to the user 110 via the settings of the corresponding display template. For example, each of the examples includes the display of at least the date, the type of transaction, the party with which the transaction occurred, and the amount of the transaction within each box representative of one of the transactions. The selection of this indicia may lead to the visualization of additional data entries such as the status (pending/completed) of the transaction, whether the transaction was conducted via an in-person process or online/digitally, the account balance before and/or after the transaction, any categorizations associated with the transaction, and any other historical data regarding the transaction, as non-limiting examples. As mentioned previously, the different display templates may vary from one another by virtue of which of the data entries associated with each of the transactions are displayed to the user 110 when the corresponding display template is selected, including providing greater or fewer of the different data entries in the visualization of the transaction. For example, some display templates may be identical to each other in terms of the categorization and sorting of the transactions, but may differ by the settings related to which of the data entries regarding each transaction are to be shown visually to the user 110.

The present invention results in the corresponding user device 104, 106 displaying the desired display template having the desired configuration and content of transaction related data thereon. As such, the present invention necessarily relies upon the use of the user device 104, 106 in executing the current method and the display 140 thereof in outputting (displaying) the desired content, and further requires the intervention of the computing system 206 in reconfiguring the user device 104, 106 and/or the necessary software application 132 for ensuring that the transaction related data corresponding to the selected display template is displayed in a desired manner and at desired instances. The computing system 206 is accordingly tasked with altering the manner in which the user device 104, 106 and/or the relevant software application 132 behaves in order to provide a benefit to the user 110 in the form of easily customized graphic content that can be readily visualized and understood by the user 110, which is especially beneficial when the user 110 is attempting to understand otherwise complicated or data intensive financial circumstances. The present method also offers the user 110 the ability to not only customize the type of content that is normally provided to the user 110 as the default for best serving the needs of the user 110, but also provides an effective and efficient method for the user 110 to quickly alter the manner in which the desired transaction related data is communicated to the user 110, such as changing the data from being displayed in a text-based listing to a chart or graph form, to further aid the user 110 in deciphering the described data. The user 110 may also select a display template that utilizes only a subset of the available transaction related data when generating the displayed graphic content, which leads to circumstances wherein the data processing required for generating the desired graphic content can be minimized. This use of limited data can aid in more quickly generating and displaying the graphic content when first requested by the user 110. The described system and method can also significantly reduce the time expended by the user 110 in retrieving any desired transaction related data via the ability of the user 110 to quickly and easily select a display template having instructions to generate the graphic content illustrating the desired transaction related data.

The use of a display template providing a separation between card-based transactions that occurred via an in-person process, such as card swiped purchases occurring in-person in a retail establishment, and digitally initiated transactions, such as online purchases, may further provide a security benefit to the user 110 by making the differentiation between such purchase types more easily ascertainable. That is, the user 110 can more easily determine where certain transactions do not align with the recent activity of the user 110, such as discovering transactions that are indicated as having occurred via an in-person process where the user 110 is aware that the user 110 has not physically visited that establishment within the given time frame. The user 110 can also more easily track the spending habits of the user 110 via such a differentiation, thereby establishing different trends depending on the types of uses of the user account in question.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A computing system for displaying customized graphic content on a graphical user interface of a user device during navigation, by a user of the user device, of a mobile banking platform managed by the computing system, the computing system comprising:
    at least one processor;
    a communication interface communicatively coupled to the at least one processor; and
    a memory device storing executable code that, when executed, causes the processor to:
        provide a selection to a user of the user device, during navigation of the mobile banking platform on the user device, regarding a display template, wherein the display template is associated with instructions utilized in determining graphic content to be displayed by the user device on the graphical user interface thereof during navigation of the mobile banking platform and upon selection of the display template by the user, wherein the graphic content determined by the selection of the display template visually represents transaction related data associated with a financial account of the user managed by the computing system, wherein the transaction related data is associated with a plurality of transactions occurring with respect to the financial account of the user, and wherein the instructions utilized in determining the graphic content displayed by the user device correspond to a sorting and grouping of the plurality of transactions into a first group including only transactions occurring via an in-person transaction process and a second group including only transactions occurring via an online digital transaction process with the first group visually represented in the graphic content separately from the second group on the graphical user interface of the user device, and wherein the instructions utilized in determining the graphic content further correspond to at least one of a filtering of the transactions to be displayed in the graphic content as a member of the first group, a filtering of the transactions to be displayed in the graphic content as a member of the second group, a sorting of the transactions to be displayed in the graphic content as a member of the first group, a sorting of the transactions to be displayed in the graphic content as a member of the second group, a sequencing of the transactions to be displayed in the graphic content as a member of the first group, a sequencing of the transactions to be displayed in the graphic content as a member of the second group, a format of the transactions to be displayed in the graphic content as a member of the first group, or a format of the transactions to be displayed in the graphic content as a member of the second group;
        reconfigure the mobile banking platform to cause the graphic content corresponding to the user selected display template to be displayed by the user device on the graphical user interface thereof during navigation of the mobile banking platform and according to the user selected display template; and
        display the graphic content corresponding to the user selected display template on the graphical user interface of the user device during navigation of the mobile banking platform.

2. The system of claim 1, wherein the selection of the display template corresponds to the format of the graphic content including a first list of transactions belonging to the first group and a second list of transactions belonging to the second group with the first list and the second list visually represented independently of each other.

3. The system of claim 1, wherein the filtering of the transactions to be displayed in the graphic content as a member of the first group or as a member of the second group includes a filtering of the transactions according to one of monetary amount or a time of occurrence.

4. The system of claim 1, wherein the sequencing of the transactions to be displayed in the graphic content as a member of the first group or as a member of the second group includes a sequencing of the transactions according to one of monetary amount or order of occurrence.

5. The system of claim 1, wherein the sorting of the transactions to be displayed in the graphic content as a member of the first group or as a member of the second group includes a sorting of the transactions according to a category of each of the transactions to be displayed in the graphic content.

6. The system of claim 1, wherein the sorting of the transactions to be displayed in the graphic content as a member of the first group or as a member of the second group includes a sorting of the transactions according to monetary value or a time of occurrence.

7. The system of claim 1, wherein the selection of the display template corresponds to the format of the graphic content visually representing the transactions belonging to one of the first group or the second group being a chart or a graph.

8. The system of claim 7, wherein the graphic content illustrates a trend in the transaction related data with respect to the transactions belonging to one of the first group or the second group.

9. The system of claim 1, wherein the graphic content illustrates a distribution of the transactions belonging to the first group or the second group according to a category of each of the transactions.

10. The system of claim 1, wherein the reconfiguring of the mobile banking platform includes replacement of existing graphic content representing the financial account of the user with the graphic content instantaneously selected by the user via the selection of the display template.

11. The system of claim 10, wherein the existing graphic content corresponds to a default display template.

12. The system of claim 10, wherein the existing graphic content corresponds to a previously selected display template.

13. The system of claim 1, wherein the display template is selected from a plurality of display templates provided by the computing system with each of the plurality of the display templates resulting in one or both of a different appearance of the graphic content or different transaction related data being displayed in the graphic content.

14. The system of claim 13, wherein the plurality of the display templates differ from one another according to at least one of a filtering criteria for determining the filtering of the transaction related data to be displayed in the graphic content, a sorting criteria for determining a categorization and grouping of the transaction related data to be displayed in the graphic content, a sequencing criteria for determining the sequencing of the transaction related data to be displayed in the graphic content, or a format criteria for determining a format of the transaction related data to be displayed in the graphic content.

15. The system of claim 13, wherein a first one of the plurality of the display templates corresponds to the transaction related data being displayed in a list of transactions and a second one of the plurality of the display templates corresponds to the transaction related data being displayed in one of a chart or graph.

16. The system of claim 13, wherein the plurality of display templates are selectable by the user contemporaneously with the displaying of the graphic content corresponding to the currently selected display template.

17. The system of claim 16, wherein each of the plurality of display templates is associated with a selectable interactive area of the graphical user interface of the user device.

18. A method of displaying customized graphic content on a graphical user interface of a user device during navigation, by a user of the user device, of a mobile banking platform, the method comprising the steps of:
   providing a selection to the user of the user device, during navigation of the mobile banking platform on the user device, regarding a display template, wherein the display template is associated with instructions utilized in determining graphic content to be displayed by the user device on the graphical user interface thereof during navigation of the mobile banking platform and upon selection of the display template by the user, wherein the graphic content determined by the selection of the display template visually represents transaction related data associated with financial account of the user, wherein the transaction related data is associated with a plurality of transactions occurring with respect to the financial account of the user, and wherein the instructions utilized in determining the graphic content displayed by the user device correspond to a sorting and grouping of the plurality of transactions into a first group including only transactions occurring via an in-person transaction process and a second group including only transactions occurring via an online digital transaction process with the first group visually represented in the graphic content separately from the second group on the graphical user interface of the user device, and wherein the instructions utilized in determining the graphic content further correspond to at least one of a filtering of the transactions to be displayed in the graphic content as a member of the first group, a filtering of the transactions to be displayed in the graphic content as a member of the second group, a sorting of the transactions to be displayed in the graphic content as a member of the first group, a sorting of the transactions to be displayed in the graphic content as a member of the second group, a sequencing of the transactions to be displayed in the graphic content as a member of the first group, a sequencing of the transactions to be displayed in the graphic content as a member of the second group, a format of the transactions to be displayed in the graphic content as a member of the first group, or a format of the transactions to be displayed in the graphic content as a member of the second group;
   reconfiguring the mobile banking platform to cause the graphic content corresponding to the user selected display template to be displayed by the user device on the graphical user interface thereof during navigation of the mobile banking platform and according to the user selected display template; and
   displaying the graphic content corresponding to the user selected display template on the graphical user interface of the user device during navigation of the mobile banking platform.

* * * * *